United States Patent
Zhu et al.

(10) Patent No.: US 10,139,544 B2
(45) Date of Patent: Nov. 27, 2018

(54) LIGHT GUIDE PLATE, BACK PLATE, EDGE-LIT TYPE BACKLIGHT MODULE AND DISPLAY DEVICE

(71) Applicants: BOE TECHNOLOGY GROUP CO., LTD., Beijing (CN); HEFEI BOE DISPLAY LIGHTING CO., LTD., Hefei, Anhui (CN)

(72) Inventors: Zhi Zhu, Beijing (CN); Yinyan Xue, Beijing (CN); Yang Yang, Beijing (CN); Zhi Yang, Beijing (CN); Yeshun Xu, Beijing (CN)

(73) Assignees: BOE TECHNOLOGY GROUP CO., LTD., Beijing (CN); HEFEI BOE DISPLAY LIGHTING CO., LTD., Hefei, Anhui (CN)

( * ) Notice: Subject to any disclaimer, the term of this patent is extended or adjusted under 35 U.S.C. 154(b) by 8 days.

(21) Appl. No.: 15/285,052

(22) Filed: Oct. 4, 2016

(65) Prior Publication Data
US 2017/0108633 A1    Apr. 20, 2017

(30) Foreign Application Priority Data
Oct. 19, 2015    (CN) .......................... 2015 1 0693008

(51) Int. Cl.
*F21V 8/00*    (2006.01)

(52) U.S. Cl.
CPC ......... *G02B 6/0021* (2013.01); *G02B 6/0088* (2013.01)

(58) Field of Classification Search
CPC .............................. G02B 6/0021; G02B 6/0088
See application file for complete search history.

(56) References Cited

U.S. PATENT DOCUMENTS

| 7,728,924 B2 * | 6/2010 | Cheng | G02B 6/0091 349/65 |
| 2006/0146574 A1 * | 7/2006 | Fu | G02B 6/0021 362/621 |
| 2014/0347887 A1 | 11/2014 | Cho et al. | |

FOREIGN PATENT DOCUMENTS

| CN | 2769945 Y | 4/2006 |
| CN | 201680234 U | 12/2010 |
| CN | 103363388 A | 10/2013 |
| CN | 203223860 U | 10/2013 |
| CN | 103823319 A | 5/2014 |
| JP | 2011-249320 A | 12/2011 |

OTHER PUBLICATIONS

First Chinese Office Action dated Dec. 9, 2016; Appln. No. 201510693008.5.
The Second Chinese Office Action dated Aug. 2, 2017; Appln. No. 201510693008.5.

* cited by examiner

*Primary Examiner* — Thomas M Sember
(74) *Attorney, Agent, or Firm* — Ladas & Parry LLP

(57) ABSTRACT

Disclosed is a light guide plate, a back plate, an edge-lit type backlight module and a display device. The light guide plate includes a main body and an extending part, wherein the extending part is disposed on a sidewall of the main body and extending outwardly, and the extending part and the sidewall of the main body define a space for accommodating a backlight source.

12 Claims, 2 Drawing Sheets

LIGHT GUIDE PLATE, BACK PLATE, EDGE-LIT TYPE BACKLIGHT MODULE AND DISPLAY DEVICE

TECHNICAL FIELD

Embodiments of the present disclosure relate to display technology, more specifically, to a light guide plate, a back plate, an edge-lit type backlight module and a display device.

BACKGROUND

A display device includes an edge-lit type backlight module and a display panel which is disposed on the light exiting surface side of the edge-lit type backlight module. Specifically, as illustrated in FIG. 1, the edge-lit type backlight module includes a light guide plate 1', a light bar 2', a reflective adhesive tape 3', a back plate 4', an optical film 5' and a reflective plate 6'. The back plate 4' serves to support the remaining components of the edge-lit type backlight module, and the reflective adhesive tape 3' serves to reflect back the light incident thereon to the light guide plate 1' so as to increase the light efficiency of utilization.

In order to better support the display panel, protect the light bar 2' and provide an appropriate position for the attachment of the reflective adhesive 3', as illustrated in FIG. 1, the back plate 4' comprises a body portion 41', and a bending portion 42' which extends inward from the side of the body plate 41' corresponding to the light bar 2' and defines a U-shape bending structure in combination with the body portion 41'. The bending portion 42' is used to support the display panel, protect the light bar 2' and receive the reflective adhesive tape 3' attached to the bending portion 42'. In the assembling process of the edge-lit type backlight module involving the back plate 4' with the above structure, the reflective tape 3' is first attached to the side of the bending portion 42' facing to the body portion 41', and then the light bar 2' is attached to the side of the body portion 41' facing to the bending portion 42', finally, the reflective plate 6', the light guide plate 1' and the optical film 5' are assembled in this order.

However, the inventors found that since the bending portion 42' usually has a relatively long length (e.g., 3.5 mm~5.3 mm) and the distance between the bending portion 42' and the body portion 41' is relatively small (e.g., 0.86 mm~1.32 mm), it is difficult to perform the processes of attaching the reflective tape 3' and the light bar 2', and therefore poor attachment is obtained between the reflective tape 3' and the light bar 2', thereby influencing the subsequent assembly of the light guide plate and the optical film and seriously impacting the performance of the edge-lit type backlight module.

SUMMARY

One of objects of the present disclosure is to provide a light guide plate, a back plate, an edge-lit type backlight module and a display device which can reduce the difficulty of assembling the edge-lit type backlight module and thus increase its performance.

A first aspect of the present disclosure is to provide a light guide plate which comprises a main body and an extending part, wherein the extending part is disposed on a sidewall of the main body and extending outwardly, and the extending part and the sidewall of the main body define a space for accommodating a backlight source.

A second aspect of the present disclosure is to provide a back plate which matches with the above light guide plate, wherein the back plate comprises a bottom plate and a sidewall extending upwardly and vertically from an edge of the bottom plate.

A third aspect of the present disclosure is to provide an edge-lit type backlight module, which comprises a backlight source, an optical film, the above light guide plate and the above back plate, wherein the backlight source is disposed on the bottom plate of the back plate, the light guide plate and the optical film are stacked on the bottom plate in this order, and the backlight source is disposed in the space defined by the extending part of the light guide plate and the sidewall of the main body A fourth aspect of the present disclosure is to provide a display device which comprises the above edge-lit type backlight module.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Figure 2:
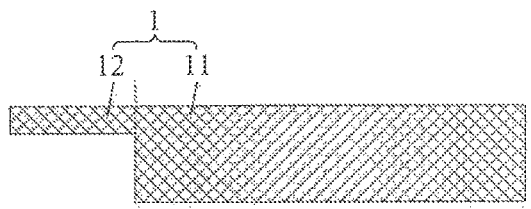
FIG. 2 schematically illustrates a partial cross section of a light guide plate according to an embodiment of the present disclosure.

An embodiment of the present disclosure provides a light guide plate which is suitable for an edge-lit type backlight module. As illustrated in FIG. 2, the light guide plate comprises a main body 11 and an extending part 12 which is disposed on a sidewall of the main body 11 and extends outwardly. That is, the extending part 12 is extended transversely from the sidewall of the main body 11 to the exterior of the light guide plate.

Figure 3:
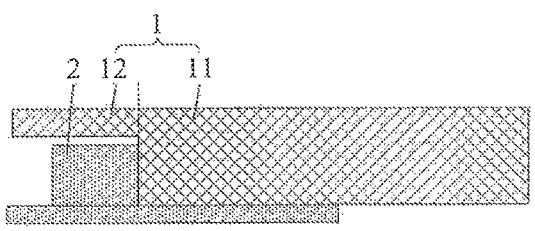
FIG. 3 schematically illustrates relative position relationship between the light guide plate and the backlight source according to an embodiment of the present disclosure.

As illustrated in FIG. 3, the extending part 12 and the sidewall of the main body 11 define an accommodation for accommodating a backlight source 2.

In the embodiment of the present disclosure, the main body 11 and the extending part 12 are formed integrally. The light guide plate 1 may be made of polycarbonate (PC) or polymethyl methacrylate (PMMA). In other embodiments of the present disclosure, the main body 11 and the extending part 12 may be made from different materials and then bonded with each other.

Figure 4:
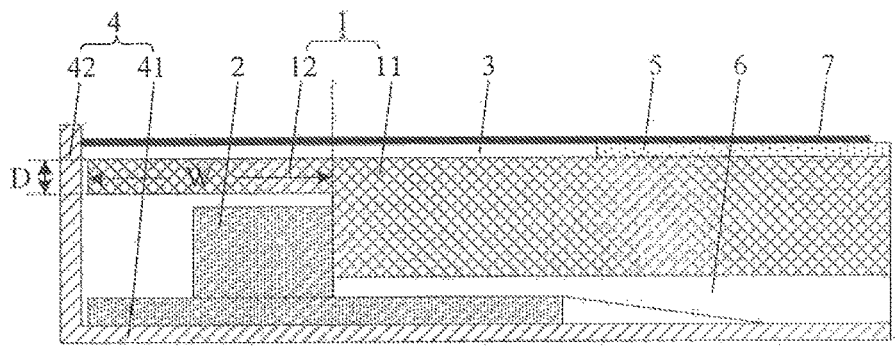
FIG. 4 schematically illustrates a partial cross section of an edge-lit type backlight module according to an embodiment of the present disclosure.

As illustrated in FIG. 4, while the light guide plate 1 is applied to the edge-lit type backlight module, the extending part 12 of the light guide plate 1 is capable of protecting the backlight source 2 which is disposed below the extending part 12, and the reflective tape 3 can be directly attached to the surface of the extending part 12 far away from the backlight source 2 during the assembling process of the edge-lit type backlight module. Furthermore, in assembling a display device, a display panel may also be placed directly to the surface of the extending part 12 of the light guide plate 1 far away from the backlight source 2 and thus no bending portion is required for the back plate 4 of the edge-lit type backlight module, so that the difficulty of assembling the edge-lit type backlight module and poor attachment in assembling various components of the edge-lit type backlight module can be reduced, thereby effectively increasing the performance of the edge-lit type backlight module.

In the embodiment of the present disclosure, as illustrated in FIG. 3, the surface of the extending part 12 of the light guide plate 1 far away from the backlight source 2 is flush with the light exiting surface of the main body 11, i.e., the whole front surface (i.e., the surface of the light guide plate 1 facing to the viewer when the viewer is watching the display device) of the light guide plate 1 is in the same horizontal plane, so that the attachment of the reflective adhesive tape 3 is easier to perform and the display panel can be better supported by the edge-lit type backlight module. In this case, the reflective adhesive tape 3 may be attached to the edge region A (the edge region A is a region of the main body 11 of the light guide plate 1 that has no optical film 5 attached thereto) of the main body 11 of the light guide plate 1 so as to reflect the light emitted from the edge region A back to the light guide plate 1. As a result, this portion of the light can exit from the center region of the main body 11 of the light guide plate 1 and thus the efficiency of light utilization of the edge-lit type backlight module is further increased. As illustrated in FIG. 4, the reflective adhesive tape 3 and the optical film 5 are disposed in the same layer and their surfaces are flush with each other.

It is noted that the embodiments of the present disclosure do not define the surface of the extending part 12 of the light guide plate 1 close to the backlight source 2. As illustrated in FIG. 3, for example, the surface of the extending part 12 close to the backlight source 2 is a horizontal plane. Alternatively, the surface of the extending part 12 close to the backlight source 2 is an uneven bend surface, step surface or inclined surface, etc. In the embodiments of the present disclosure, the extending part 12 is in a shape of plate, and the surface of the extending part 12 close to the backlight source 2 is a horizontal plane, i.e., the longitudinal cross section of the extending part 12 has a shape of rectangle.

Alternatively, as illustrated in FIG. 4, in the embodiments of the present disclosure, the width W of the extending part 12 of the light guide plate 1 depends on the horizontal distance between the light exiting surface of the backlight source 2 in the edge-lit type backlight module (i.e., the vertical surface of the backlight source 2 on the right) and the back plate 4, so that the extending part 12 is able to protect the backlight source 2 below it as well as possible, provide a maximum space for the attachment of the reflective adhesive tape 3, and support the display panel to the greatest extent. For example, the width W of the extending part 12 is less than or equal to the distance between the light exiting surface of the backlight source 2 and the back plate 4. For example, the width W of the extending part 12 is 1.3 mm~1.6 mm.

Alternatively, as described above, in the embodiment of the present disclosure, the material of the light guide plate 1 is PC or PMMA. Since PC or PMMA both have high rigidity, the thickness of the extending part 12 of the light guide plate 1 in the embodiments of the present disclosure may be equal to or less than the thickness of the back plate. For example, where the thickness of the back plate is approximately 0.37 mm, the thickness D of the extending part 12 is 0.35 mm~0.4 mm, e.g., approximately 0.37 mm, so as to make the size of the edge-lit type backlight module comprising the light guide plate 1 be matched with the prior the back plate. As a result, no change is required to the size of the remaining components of the display device.

It is understood that the person skilled in the art may set the width W and the thickness D of the extending part 12 of the light guide plate 1 as required, for example, according to the size, model and the like of the display device, thus, the embodiments of the present disclosure do not define the width W and the thickness D.

The embodiments of the present disclosure provide a light guide plate 1 as described above. Since the light guide plate 1 comprises a extending part 12 which defines an accommodating space for accommodating a backlight source 2 in combination with the sidewall of the main body 11, the backlight source 2 may be disposed in the accommodating space when the light guide plate 1 is applied in the edge-lit type backlight module, and thus the extending part 12 can serve to support a display panel, protect the backlight source 2, and provide an appropriate position for the attachment of the reflective adhesive tape 3. As a result, no bending portion is required for the back plate 4 of the edge-lit type backlight module, so that the difficulty of assembling the edge-lit type backlight module and poor attachment in assembling various components of the edge-lit type backlight module can be reduced, thereby effectively increasing the performance of the edge-lit type backlight module.

Additionally, it is difficult to disassemble a defective product in the disassembly process for repairing it. And the bending portion 42' of the back plate 1' is easy to be deformed, which will affect the performance of the edge-lit type backlight module and thus impact the display effect of the display device. Due to the structure of the light guide plate 1 as described above in the embodiments of the present disclosure, no bending portion is required for the back plate 4 of the edge-lit type backlight module. As a result, it is easy to disassemble the defective product and the back plate 4 is not apt to be deformed. Therefore, the disassembly will not impact the performance of the edge-lit type backlight module, and a good display effect can be guaranteed.

Figure 1:
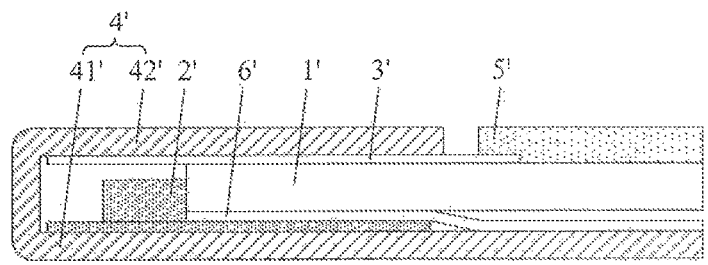
FIG. 1 schematically illustrates a partial cross section of an edge-lit type backlight module.
Figure 5:
FIG. 5 schematically illustrates a partial cross section of a back plate according to an embodiment of the present disclosure.

Another embodiment of the present disclosure provides a back plate that matches the light guide plate as described above. As illustrated in FIG. 5, the back plate 4 comprises a bottom plate 41 and a sidewall 42 extending upwardly and vertically from the edge of the bottom plate 41. For example, the material of the back plate 4 is aluminum. Since no bending portion as illustrated in FIG. 1 is disposed in the back plate 4, the difficulty of assembling the edge-lit type backlight module and poor attachment in assembling various components of the edge-lit type backlight module can be reduced, thereby effectively increasing the performance of the edge-lit type backlight module.

Yet another embodiment of the present disclosure provides an edge-lit type backlight module, as illustrated in FIG. 4, it comprises the light guide plate 1 as described above, the backlight source 2, the back plate 4 and the optical film 5. The backlight source 2 is disposed on the bottom plate 41 of the back plate 4. The light guide plate 1 and the optical film 5 are stacked on the bottom plate 41 in this order. The backlight source 2 is disposed in the space defined by the extending part 12 of the light guide plate 1 and the sidewall of the main body 11. Since the edge-lit type backlight module comprises the light guide plate 1 and the back plate 4 as described above, the difficulty of assembling the edge-lit type backlight module could be reduced and hence the fault is not easy to occur in assembling various components of the edge-lit type backlight module, thereby effectively increasing the performance of the edge-lit type backlight module. For example, the optical film 5 comprises a diffuser plate, a prism and the like.

As illustrated in FIG. 4, the edge-lit type backlight module according to the embodiments of the present disclosure further comprises a reflective adhesive tape 3. The reflective adhesive tape 3 covers at least the surface of the extending part 12 of the light guide plate 1 far away from the backlight source 2, so as to make the light incident on the extending part 12 reflected back to the light guide plate 4' and then exit the light guide plate 1 from the main body 11, thereby the efficiency of light utilization is increased. As described above, the reflective adhesive tape 3 may be attached to the edge region A (the edge region A is a region of the main body 11 of the light guide plate 1 that has no optical film attached) of the main body 11 of the light guide plate 1 so as to reflect the light emitted from the edge region A back to the light guide plate 1, as a result, this portion of the light can exit from the center region of the main body 11 of the light guide plate 1 and thus the efficiency of light utilization of the edge-lit type backlight module is further increased. For example, the reflective adhesive tape 3 is a white tape.

In the embodiments of the present disclosure, the surface of the reflective adhesive tape 3 far away from the light guide plate 1 is flush with the surface of the optical film 5 far away from the light guide plate 1, so that the light exiting surface of the edge-lit type backlight module is configured as a flat surface and thus the display panel can be better supported. For example, where the surface of the extending part 12 of the light guide plate 1 far away from the backlight source 2 is flush with the light exiting surface of the main body 11, and the thickness of the reflective adhesive tape 3 and the optical film 5 are equal to each other, the surface of the reflective adhesive tape 3 far away from the light guide plate 1 and the surface of the optical film 5 far away from the light guide plate 1 are flush with each other. It is understood that the person skilled in the art may make the surface of the reflective adhesive tape 3 far away from the light guide plate 1 flush with the surface of the optical film 5 far away from the light guide plate by other means, and there is no limitations to the specific configuration.

Alternatively, as illustrated in FIG. 4, the edge-lit type backlight module of the embodiments of the present disclosure further comprises a reflective plate 6 which reflects the light exited from the back surface (i.e., the surface opposed to the viewer when the viewer is watching the display device) of the light guide plate 1 back to the light guide plate 1, thereby the efficiency of light utilization is further increased.

Additionally, as illustrated in FIG. 4, the edge-lit type backlight module in the embodiments of the present disclosure further comprises a frame glue 7 which is attached to the peripheral region of the edge-lit type backlight module, so that the light emitted from the edge-lit type backlight module cannot enters the peripheral region of the display panel and thus the peripheral region of the display panel is free from the light leakage, thereby improving the display effect of the display device.

An exemplary procedure of assembling the edge-lit type backlight module of FIG. 4 comprises steps of: disposing the backlight source 2 on the bottom plate 41 of the back plate 4; and then stacking the reflective plate 6, the light guide plate 1 and the optical film 5 in this order; next, attaching the reflective adhesive tape 3; finally attaching the frame glue 7. Compared with the assembly procedure for the edge-lit type backlight module of FIG. 1, above assembly procedure for the edge-lit type backlight module is easier, so that poor attachment is not easy to occur in assembling various components of the edge-lit type backlight module, thereby effectively increasing the performance of the edge-lit type backlight module.

Additionally, still another embodiment of the present disclosure further provides a display device comprising the edge-lit type backlight module as described above. The display device may be LCD panels, E-paper, OLED (Organic Light Emitting Diode) panels, LCD TVs, LCDs, digital photo frames, mobile phones, tablet computer and any other product or component having a display function. Due to the edge-lit type backlight module is included in the display device, the manufacture process for it is also become easier and a better display effect can be obtained. In at least some of the embodiments, the display device may further comprise a display panel disposed on the light exiting side of the edge-lit type backlight module. The structure of the display panel may be arranged with reference to the existing technology, which is not elaborated here.

What is described above is related to the illustrative embodiments of the disclosure only and not limitative to the scope of the disclosure; the scopes of the disclosure are defined by the accompanying claims.

The present application claims the priority of Chinese patent application No. 201510693008.5 filed on Oct. 19, 2015, the disclosure of which is incorporated herein by reference in its entirety.

The invention claimed is:

1. A light guide plate comprising a main body and an extending part, wherein the extending part is disposed on a sidewall of the main body and extending outwardly, and the extending part and the sidewall of the main body define a space for accommodating a backlight source,
   wherein a reflective adhesive tape overlays at least a surface of the extending part of the light guide plate far away from the backlight source.

2. The light guide plate according to claim 1, wherein the surface of the extending part far away from the backlight source is flush with a light exiting surface of the main body.

3. The light guide plate according to claim 2, wherein a longitudinal cross section of the extending part is rectangular.

4. The light guide plate according to claim 3, wherein a width of the extending part is ranged from 1.3 mm to 1.6 mm.

5. The light guide plate according to claim 3, wherein a thickness of the extending part is ranged from 0.35 mm to 0.4 mm.

6. The light guide plate according to claim 1, wherein a surface of the extending part close to the backlight source is a flat surface.

7. A back plate, wherein the back plate is cooperated with the light guide plate of claim 1 and comprises a bottom plate and a pair of sidewalls extending upwardly and vertically from an edge of the bottom plate.

8. An edge-lit type backlight module comprising a backlight source, an optical film, the light guide plate of claim 1 and the back plate of claim 7, wherein the backlight source is disposed on the bottom plate of the back plate, the light guide plate and the optical film are stacked on the bottom plate sequentially, and the backlight source is disposed in the space defined by the extending part of the light guide plate and the sidewall of the main body.

9. The edge-lit type backlight module according to claim 8, wherein a surface of the reflective adhesive tape far away from the light guide plate and a surface of the optical film far away from the light guide plate are flush with each other.

10. The edge-lit type backlight module according to claim 8, wherein the reflective adhesive tape is attached to an edge region of the main body.

11. The edge-lit type backlight module according to claim 8, wherein a width of the extending part is less than or equal to a distance between a light exiting surface of the backlight source and the back plate.

12. A display device comprising the edge-lit type backlight module according to claim 8.

* * * * *